United States Patent [19]

Berman

[11] Patent Number: 4,585,155
[45] Date of Patent: Apr. 29, 1986

[54] EXPLOSIVE WELDING PATCH UNIT AND METHOD

[75] Inventor: Irwin Berman, Montclair, N.J.

[73] Assignee: Foster Wheeler Energy Corporation, Livingston, N.J.

[21] Appl. No.: 604,707

[22] Filed: Apr. 27, 1984

[51] Int. Cl.⁴ .............................................. B23K 20/08
[52] U.S. Cl. ..................................... 228/107; 228/108; 228/109; 228/119; 228/212; 228/2.5
[58] Field of Search ................................ 228/107–109, 228/119, 212, 2.5, 175

[56] References Cited

U.S. PATENT DOCUMENTS

| 3,263,323 | 8/1966 | Maher et al. | 228/107 |
| 3,675,309 | 7/1972 | Borkoski | 228/119 |
| 3,774,291 | 11/1973 | Snyder et al. | 228/107 X |
| 3,912,148 | 10/1975 | Johnson | 228/119 X |
| 4,095,734 | 6/1978 | Persson | 228/107 X |
| 4,106,687 | 8/1978 | Bement | 228/107 X |
| 4,398,660 | 8/1983 | Pampalone et al. | 228/175 |

FOREIGN PATENT DOCUMENTS 70366  6/1976  Australia ........................ 228/107

Primary Examiner—Nicholas P. Godici
Assistant Examiner—K. Skillman
Attorney, Agent, or Firm—Marvin A. Naigur; John E. Wilson; Martin Smolowitz

[57] ABSTRACT

A patch unit apparatus and method for expeditiously closing openings in metal walls by explosive welding. The patch unit comprises a metal plate having on one side an explosive charge located near the plate perimeter, and having on the opposite side a continuous double angled recess surface. After cleaning the wall surface, the patch unit is placed centrally over an opening to be closed and initially secured to the wall by an adhesive material provided on the plate side opposite from the explosive. If necessary, a mechanical type seal can also be used for improved sealing of the patch unit to the wall. The explosive charge is then detonated to explosively force the patch plate unit against the wall at high velocity, so as to weld the plate onto the metal wall to permanently close the opening, and thereby provide substantially the original strength to the metal wall.

13 Claims, 8 Drawing Figures

EXPLOSIVE WELDING PATCH UNIT AND METHOD

BACKGROUND OF INVENTION

The present invention pertains to an apparatus and method for expeditiously closing holes in metal walls by using explosive welding. It pertains particularly to an apparatus and method for patching holes in metal walls such as for armored military equipment by using an explosive welding patch unit and procedure for attaching a special metal plate patch unit to expeditiously close such holes under emergency conditions.

New military tanks that are being built today are almost entirely formed from flat sheets of armored plate and there is virtually no curved exterior armor used. When these new type of tanks are in combat, many times cracks or holes are inflicted and it would be advantageous to have a do-it-yourself repair system available for use in the field. Consequently, a need often exists to close holes permanently in various types of metal equipment on an emergency basis. In particular, such a need exists for emergency repair of military tanks and similar equipment under battlefield conditions.

Explosion welding procedures have been generally known and used for many years. As disclosed in an article by L. Bement in *Welding Journal,* March 1973, pages 147–154, methods for explosive welding of metal sheets such as aluminum, copper and titanium to plates for cladding purposes or for localized welding of such sheets together have been developed. Also, U.S. Pat. No. 4,106,687 to Berment discloses a confinement method and associated apparatus for joining metals together by explosive welding procedures. However, such explosive welding methods and apparatus are not adapted for use under emergency field conditions. To meet this need, the present invention utilizes an explosive charge for providing a completely new apparatus and method for the rapid and permanent repair of holes in metal walls, such as for armored vehicles, military tanks, etc.

SUMMARY OF INVENTION

This invention provides an explosives welding patch unit and method for expeditiously patching openings in metal walls, such as in armored vehicles, using explosive welding. The invention utilizes an explosively weldable patch unit, which is placed over an opening in a metal base plate or wall and is initially attached to the wall by suitable securing means such as an adhesive coating, before explosively welding the plate to the wall. The patch unit plate on the side mating with a base plate or wall is provided with a double angled recess, and is usually coated on the same side with an adhesive coating for securing the patch unit to the wall. The adhesive coating is protected by a removable cover sheet such as paper or other such means, and the sheet is removed prior to use of the patch unit. An explosive device is provided attached to the opposite outer peripheral surface of the patch unit plate and is used to explosively force the unit against a metal wall to seam weld the patch unit plate onto the metal wall, so as to effectively close an opening therein for a permanent installation. If needed, a suitable mechanical seal such as a gasket or "O" ring, can be provided in the patch unit plate adjacent to the adhesive coating to seal areas in which the metal surface to be covered by the patch unit is not sufficiently smooth for the adhesive to provide an effective seal and explosive weld.

More specifically, the invention provides a patch unit for closing an opening in a metal wall by explosive welding, said unit comprising a metal plate adapted for covering an opening in a metal wall, said plate having a continuous double angled recess on one side thereof; securing means such as an adhesive coating on the plate sealing side adjacent the recess, said adhesive being covered with a removable cover sheet; and an explosive charge attached to the opposite side of said plate within an enclosure near the perimeter of the plate, whereby said metal plate can be sealably attached to the metal wall by the adhesive prior to detonating the explosive charge for explosively welding the plate onto the wall.

In the method of the invention for closing an opening in a metal wall by explosive welding, the necessary steps are first mechanical cleaning the metal wall surface around the opening to remove any foreign material adhering to the surface, placing an explosive patch unit containing an explosive charge centrally over the cleaned surface so as to cover the opening and secure the patch unit to the metal wall, and then detonating the explosive material in said patch unit and explosively forcing the metal patch unit against the metal wall at high velocity and thereby explosively welding the patch unit onto the metal wall to close the opening.

The explosive welding patch unit system can be advantageously provided as a repair kit. A military tank or support vehicle can carry one or more such packaged repair kits, so that when needed a repair to close an opening can be made expeditiously by a crew member. It is an advantage of the present invention that various shaped holes or openings in metal walls can readily be covered and permanently sealed by the explosive welding patch unit and method without need for special tools.

DESCRIPTION OF INVENTION

Figure 1:
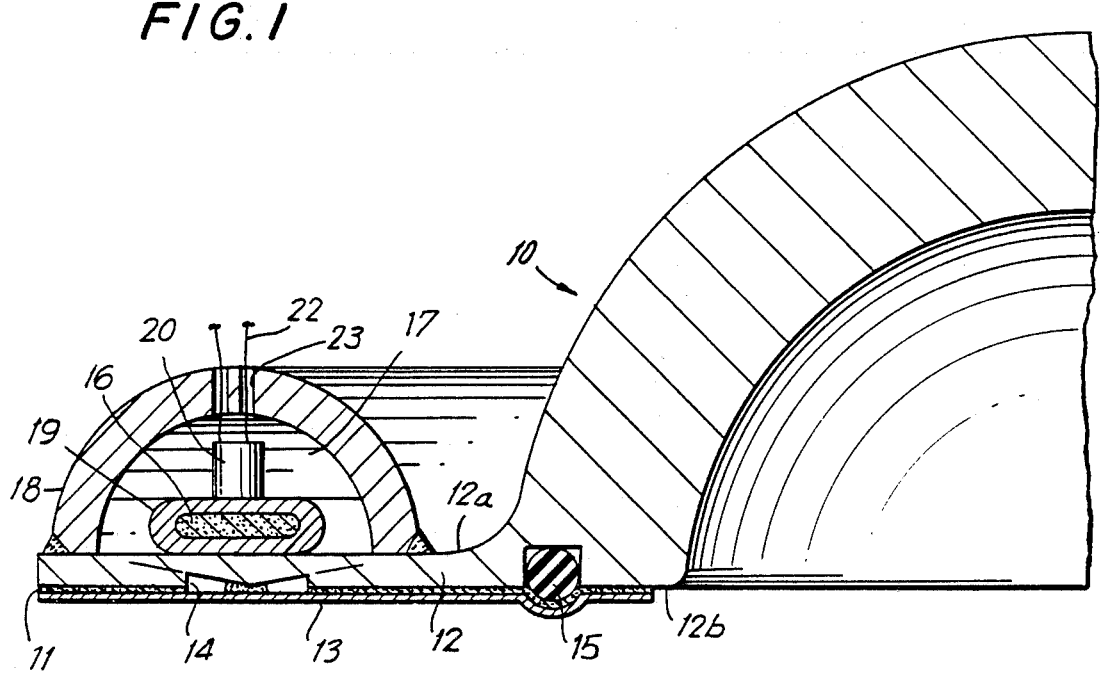
FIG. 1 shows a partial cross-sectional view of an emergency patch unit containing an explosive charge used for attaching the unit to a metal wall by explosive welding.
Figure 1A:
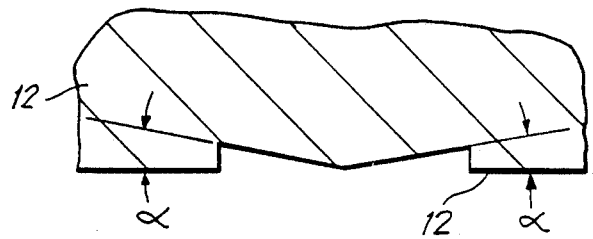
FIG. 1A is a fragmented detail view of a portion of FIG. 1, enlarged.
Figure 6:
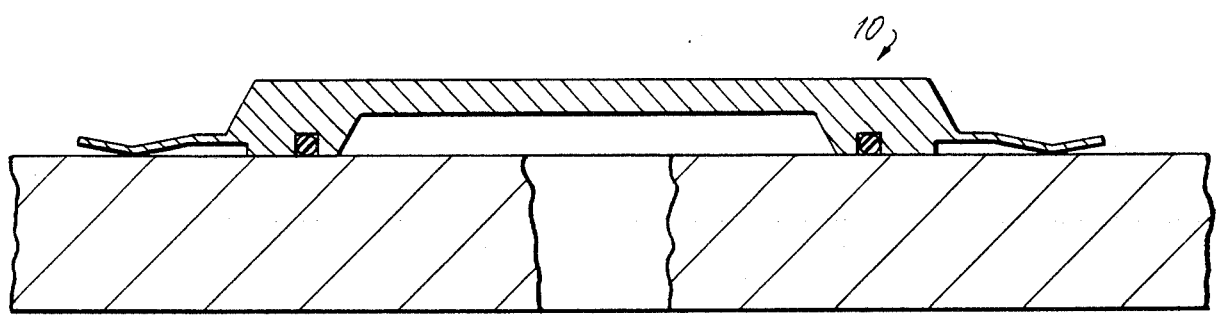
FIG. 6 shows a cross-sectional view of a specific patch unit explosively welded to a thick base plate.

As shown in FIG. 1, a patch unit 10 is provided which includes a plate 12 made of a weldable material such as steel or other weldable metal. The patch unit plate 12 has on one side a local separation in the shape of a continuous double angled recess 14 provided to achieve the high velocity angular collision necessary for making an explosive welded joint with a mating metal wall. Such local recess or separation usually varies between about 0.010–0.025 in. deep, and can be preferably provided by dual angled surfaces in the shape of an inverted V machined into the patch unit plate 12, as shown in FIG. 1. Alternatively, the outer periphery of the patch plate 12 can have a thin portion bent into the desired inverted V-shape, as generally shown in FIG. 6.

Figure 6A:
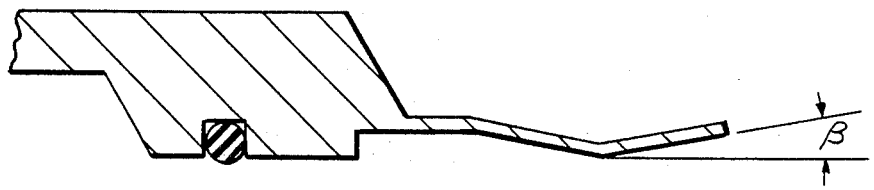
FIG. 6A is a fragmented detail view of a portion of FIG. 6, enlarged.

The axisymmetric shaped groove 14 is usually circular and is machined in the bottom surface 12b of the patch unit plate 12 to aid in making an explosive seam weld. This groove 14 may be about 0.02 inch maximum depth and 0.5 inch wide, with a taper formed by angle $\alpha$ of about 2–10 degrees and preferably 3–6 degrees away from the lower side 12b of the patch unit plate 12 as shown in FIG. 1. Other welding configurations can be used such as providing a curved or bent edge on the peripheral flyer plate portion or a groove in the base plate. A dual bent edge is shown in FIG. 6A.

The bottom or sealing side 12b of the patch unit plate 12 is preferably selectively coated where shown except for the groove or recess 14 with a layer of self-sticking adhesive or glue 11 for initially securing the patch unit to a base plate or wall surface. The adhesive 11 is covered by a removable cover sheet 13, such as paper or plastic to protect the adhesive 11 before use of the patch unit for closing an opening. Other suitable means for initially securing the patch unit to the wall include a central bolting arrangement.

Additionally, seal means such as an "O" ring 15 can be used to help seal any surface irregularities or high spots on the base plate or wall surface when the base plate to which plate unit 10 is being welded is not sufficiently flat and smooth, and thus confine the welding action to the angled recess area.

An explosive material 16 in ribbon form is provided on upper side 12a of plate 12. An infrangible enclosure 18 may be used to cover the explosive material 16 and an encasement carrier 19 of a suitable material such as lead alloy or plastic can be provided within the enclosure. The encasement carrier 19 may be lead-antimony about 0.52 inch wide and 0.35 inch thick. This enclosure 18 is also filled with a filter material 17, which forms a snug fit around the explosive and carrier 19 therein. The explosive material 16 can be made of RDX (cyclotrimethyline tetranitrate) or PETN (pentaerythrital tetranitrate) or similar explosive materials.

At one point around the circumference of patch unit plate 12, a blasting cap 20 is provided for setting off the explosive material 16. This cap location is advantageously where the casing and charge have been cut and tightly reassembled. Two wires 22 from the detonating cap 20 are led out through small openings 23 in the infrangible enclosure 18 for use in electrically detonating the explosive 16.

Figure 2:
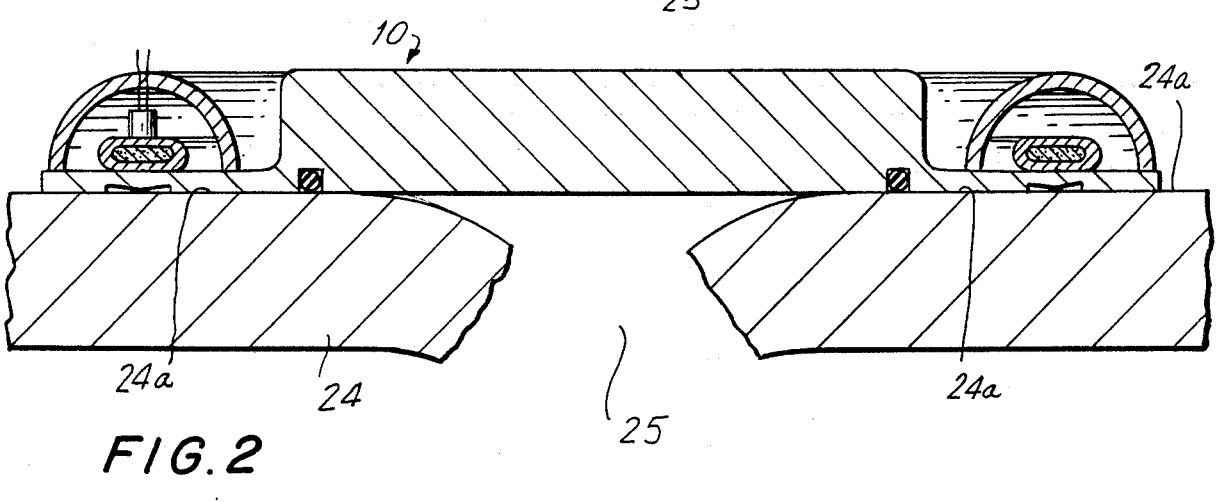
FIG. 2 shows a flat-shaped emergency patch unit used to patch a hole in a flat wall by explosive welding.

In the method of the present invention, as typically shown in FIG. 2, the surface immediately surrounding an opening 25 in a wall 24 to be sealed by patch unit 10 is usually coated with various foreign materials, such as paint, rust, dirt, etc. adhering to the surface. Such surrounding surface 24a should first be mechanically cleaned such as by scraping or brushing with a steel wire brush or other suitable means available to adequately clean the area around the opening to be covered, and then surface 24a should be solvent degreased. These cleaning implements and supplies can be provided along with the patch unit in a repair kit. For making an effective welded patch, the surface to be welded should be cleaned as much as possible. After cleaning, the explosive patch unit 10 equipped with an explosive charge such as shown in FIG. 1, can be used by placing it centrally over the opening to be closed.

Figure 3:
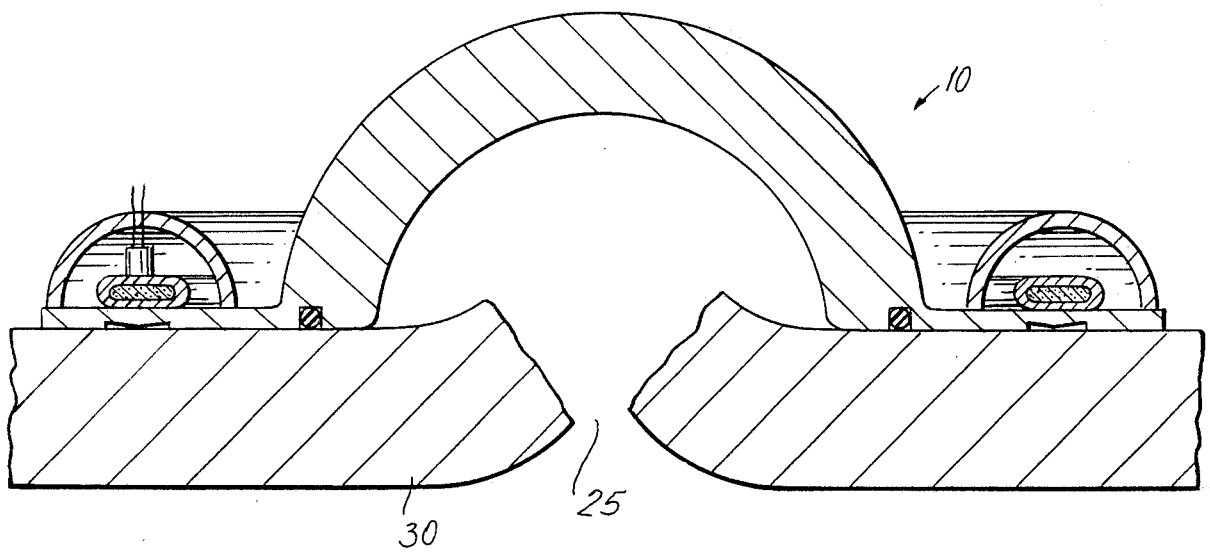
FIG. 3 shows a dome-shaped emergency patch unit used for closing a protruding opening in a metal wall by explosive welding.

The patch unit 10 can have a generally flat shape as shown in FIG. 2 for sealing openings in flat surfaces, or can have an outwardly curved shape such as for sealing openings in irregular surfaces as shown in FIG. 3, and the patch unit can be generally circular or oblong in shape in plan view. The patch unit 10 can be placed either on the smooth outside surface of a wall 24 as shown in FIG. 2, or on protruding outside surface of wall 30 as in FIG. 3.

Figure 4:
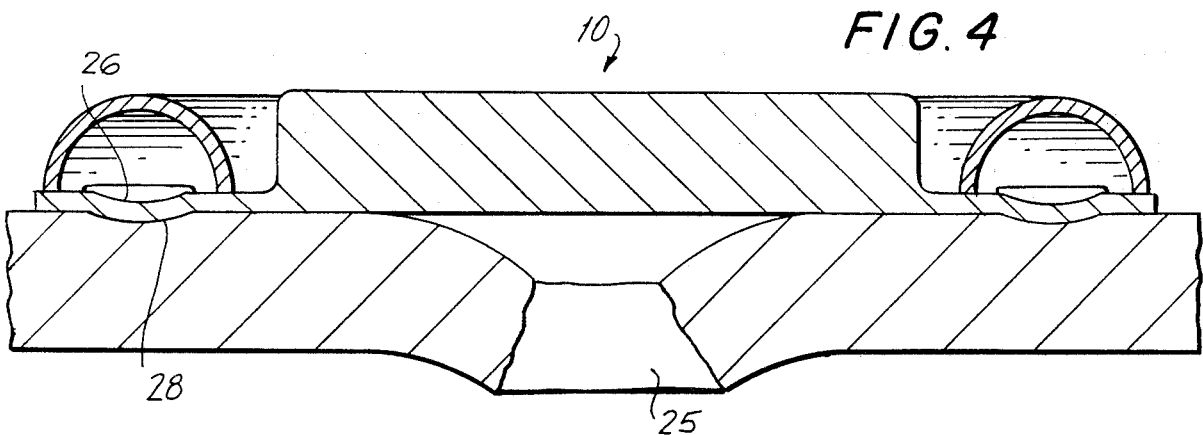
FIG. 4 shows a cross-sectional view of a patch unit after being welded over an opening in a metal wall by explosive welding.

After the surface area surrounding an opening 25 to be repaired is cleaned, the protective cover sheet 13 is removed from the adhesive 11 on the bottom surface 10b of the patch unit 10, and the patch unit is placed centrally over the opening to be closed and initially secured to the wall by the adhesive. The wires 22 are unfolded and connected to a suitable detonator means (not shown). All personnel are then removed to a safe location, and the explosive charge 16 is detonated electrically. The explosive charge drives plate 12 against base plate 24 or 30 at a high velocity, such as exceeding about 3,000 feet per second, so that plate 12 is explosively welded at groove 14 to the base plate. The completed patch is thereby formed permanently over the opening 25, as is generally shown in FIG. 4. It is noted that the lower surface 12b of plate 12 is deformed downwardly slightly along line 26 to form weld bead 28 at the location of former groove 14, which secures permanently the patch unit 10 to the base plate.

Figure 5:
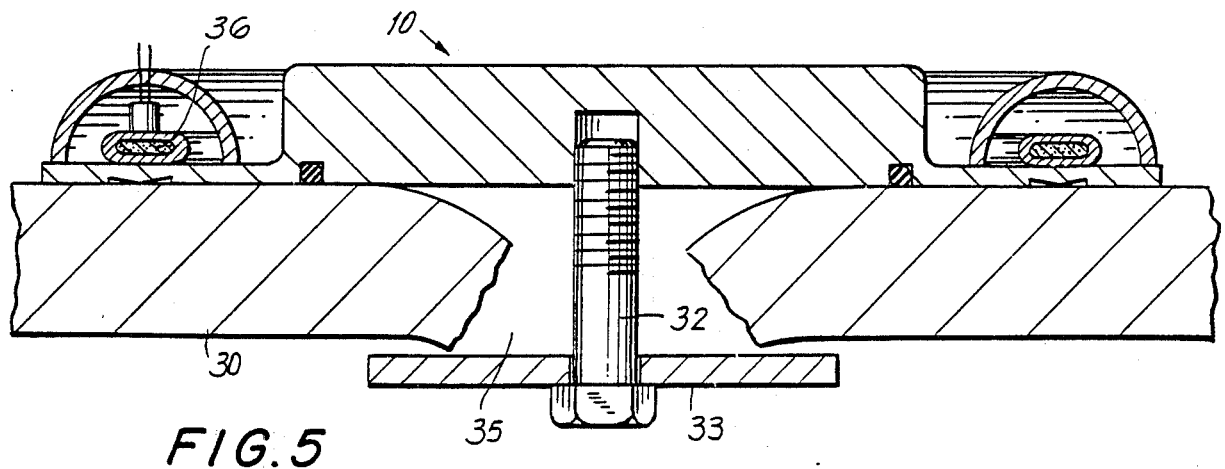
FIG. 5 shows a patch unit being retained over an opening in a flat wall by mechanical fastener means prior to explosive welding.

In closing an opening by explosive welding, if it is not possible or desirable to detonate an explosive charge, as an interim alternative solution a patch unit can be initially secured mechanically to a metal baseplate 30, such as by bolt 32 and adapter plate 33 to close an opening 35, as generally shown in FIG. 5. However, such a temporary patch has the disadvantage of not being welded onto the base plate. The explosive device 36 in the patch unit can be subsequently fired to weld the patch unit 10 onto the base plate and permanently close the opening 35.

If the wall 24 to which the patch unit is joined is not relatively thicker than the patch unit plate 12, an anvil back up plate is preferably provided on the opposite side of the wall to partly absorb the explosive impact force from the welding.

Although the patch unit of the present invention has been described for closing openings in armored vehicles, it is also applicable especially for emergency uses on submarines and other ships, large storage tanks, and such. The patch unit can also be used for explosively welding closed the end of a metal container, similarly as in FIG. 1 except the wall is a flanged opening for the container.

The present invention will be further described by reference to the following example, which should not be construed as limiting in scope.

EXAMPLE

The method and utility of the invention was demonstrated by closing a hole in a metal plate by using an explosive welding patch unit. A flat steel patch plate about 0.5 inch thick and having an adhesive coating and an "O" ring seal as shown in FIG. 6 was placed over and initially secured to a large steel base plate 1 inch thick, which had a central threaded hole, and the patch plate was explosively welded to the base plate. The patch plate had a thin outer edge about 0.032 inch thick and formed with a double taper angle B of 4.5 degrees, as shown in FIG. 6A. The explosive used was 30 grains RDX per linear foot and the explosive had an encasement carrier of lead-antimony. In this test, an infrangible closure was not used over the explosive charge.

Following the detonation of the explosive to explosively weld the steel patch plate unit onto the base plate, the weld was subsequently gas pressure tested through the central threaded hole in the base plate and no leaks were detected. Thus, this welding test demonstrated the effectiveness and utility of the present invention for closing openings in a metal wall using an explosive welded patch unit.

Although the present invention has been described broadly and in terms of certain preferred embodiments, it will be understood that other modifications and variations can be made within the scope of the invention, which is defined by the following claims.

I claim:

1. A welding patch unit useful for closing an opening in a metal wall by explosive welding, said unit comprising:
   (a) a metal plate adapted for covering an opening in a metal wall, said plate having a continuous double angled recess on one side thereof for placing against the metal wall;
   (b) securing means associated with said plate for initially attaching the plate over an opening in the metal wall; and
   (c) an explosive charge attached to the opposite side of said plate and within an enclosure near the perimeter of the plate, whereby said metal plate can be initially attached to the metal wall by the securing means prior to detonating the explosive charge for explosively welding the plate onto the wall.

2. A patch unit according to claim 1, wherein the plate sealing surface adjacent the wall contains a double angled recess angled at 2–10 degrees from the plate sealing surface to facilitate explosively welding the plate unit onto the metal wall.

3. A patch unit according to claim 1, where said securing means is an adhesive coating on the plate sealing side adjacent said recess, said adhesive being covered with a removable sheet covering.

4. A patch unit according to claim 1, where said securing means is a centrally located bolt and adapter plate.

5. A patch unit according to claim 1, wherein said plate has a mechanical seal means incorporated therein on its sealing surface and located radially inwardly from said double angled recess.

6. A patch unit according to claim 5, wherein said plate mechanical seal means in an "O" ring.

7. A patch unit according to claim 1, wherein the metal plate has an outwardly curved central portion suitable for being placed over a protrusion of the wall being sealed.

8. A welding patch unit useful for closing an opening in a metal wall by explosive welding, said unit comprising:
   (a) a metal plate having an outwardly curved central portion for covering an opening in a wall, said plate having a continuous double angled recess on one side thereof for placing against the metal wall;
   (b) an adhesive coating on the plate sealing side adjacent said recess, said adhesive being covered with a removable sheet covering;
   (c) a mechanical seal means provided on the side of the metal plate adjacent the recess; and
   (d) an explosive charge attached to the opposite side of said plate and within an enclosure located near perimeter of the plate, whereby the double angled recess located on the sealing side of said metal plate adjacent the wall facilities explosively welding the plate onto the metal wall, and so that the plate can be initially attached to the metal wall prior to detonating the explosive charge and explosively welding the plate onto the wall.

9. A method for closing an opening in a metal wall by explosive welding, comprising:
   (a) mechanically cleaning the metal wall surface around the opening to remove any foreign material adhering to the surface;
   (b) placing an explosive welding metal patch unit centrally over the cleaned surface around the opening so as to cover the opening, and initially securing the patch unit to the wall, said patch unit containing an explosive charge and having a continuous double angled recess on the side contacting the wall; and
   (c) electrically detonating the explosive charge on said welding patch unit and explosively forcing the metal patch unit against the metal wall at a sufficiently high velocity so as to explosively weld the patch unit onto the wall to close the opening.

10. The closing method of claim 9, wherein said patch unit is initially secured to said metal wall by an adhesive coating on the patch unit.

11. The closing method of claim 10, wherein a cover sheet is removed from said adhesive coating on the patch unit surface before placing the patch unit onto the cleaned metal wall surface.

12. The closing method of claim 9, wherein said patch unit is additionally mechanically sealed to the metal wall to cover the opening before explosive welding the patch unit onto the wall.

13. A method for closing an opening in a metal wall by explosive welding, comprising:
   (a) mechanically cleaning the metal wall surface around the opening to remove any foreign material adhering to the surface;
   (b) removing a covering sheet from an adhesive coating of an explosive welding patch unit, then placing said patch unit centrally over the cleaned wall surface around the opening so as to cover the opening and initially secure the patch unit to the wall, said patch unit containing an explosive charge and having a continuous double angled recess on the side contacting the wall; and
   (c) electrically detonating explosive material charge in said patch unit and explosively forcing the metal patch unit against the metal wall at a sufficiently high velocity and thereby explosively welding the patch unit onto the metal wall to close the opening.

* * * * *